May 4, 1943.  A. E. DUERIG  2,318,567
CONVEYER RELEASE MECHANISM
Filed April 23, 1940   2 Sheets-Sheet 1
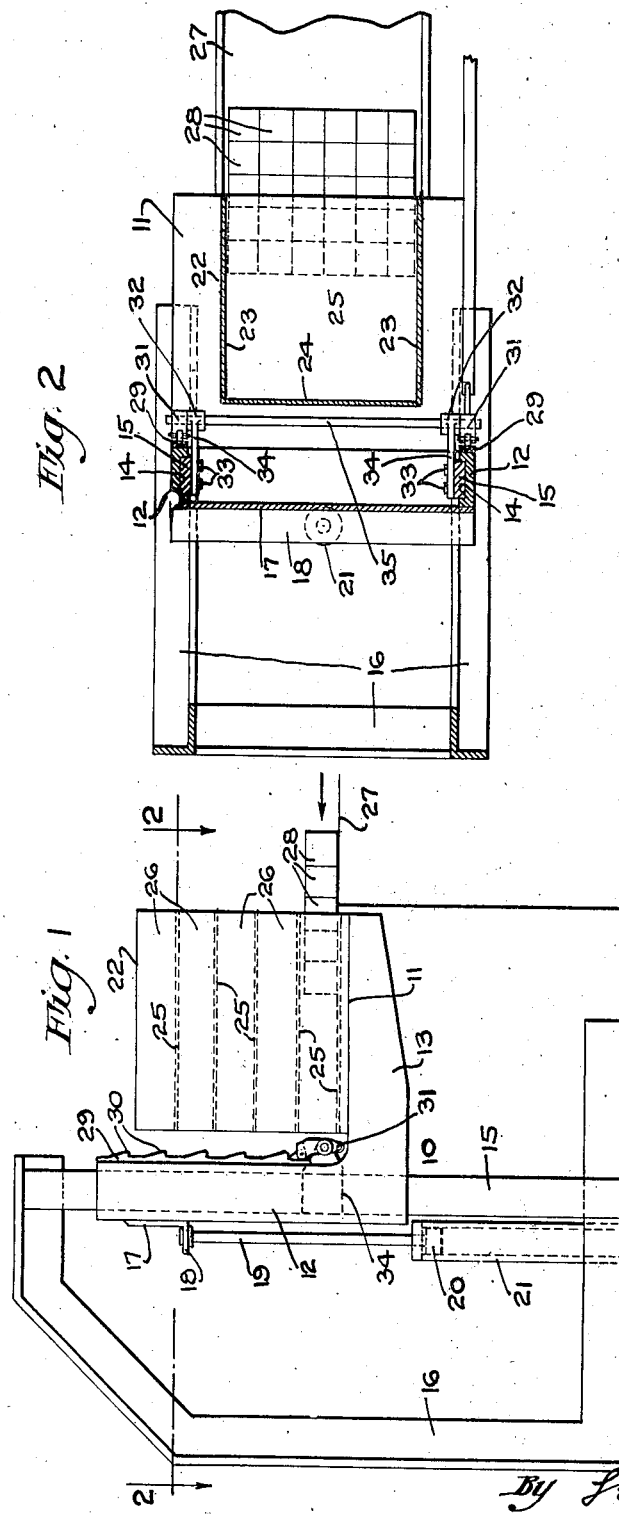
Inventor
ALFRED E. DUERIG

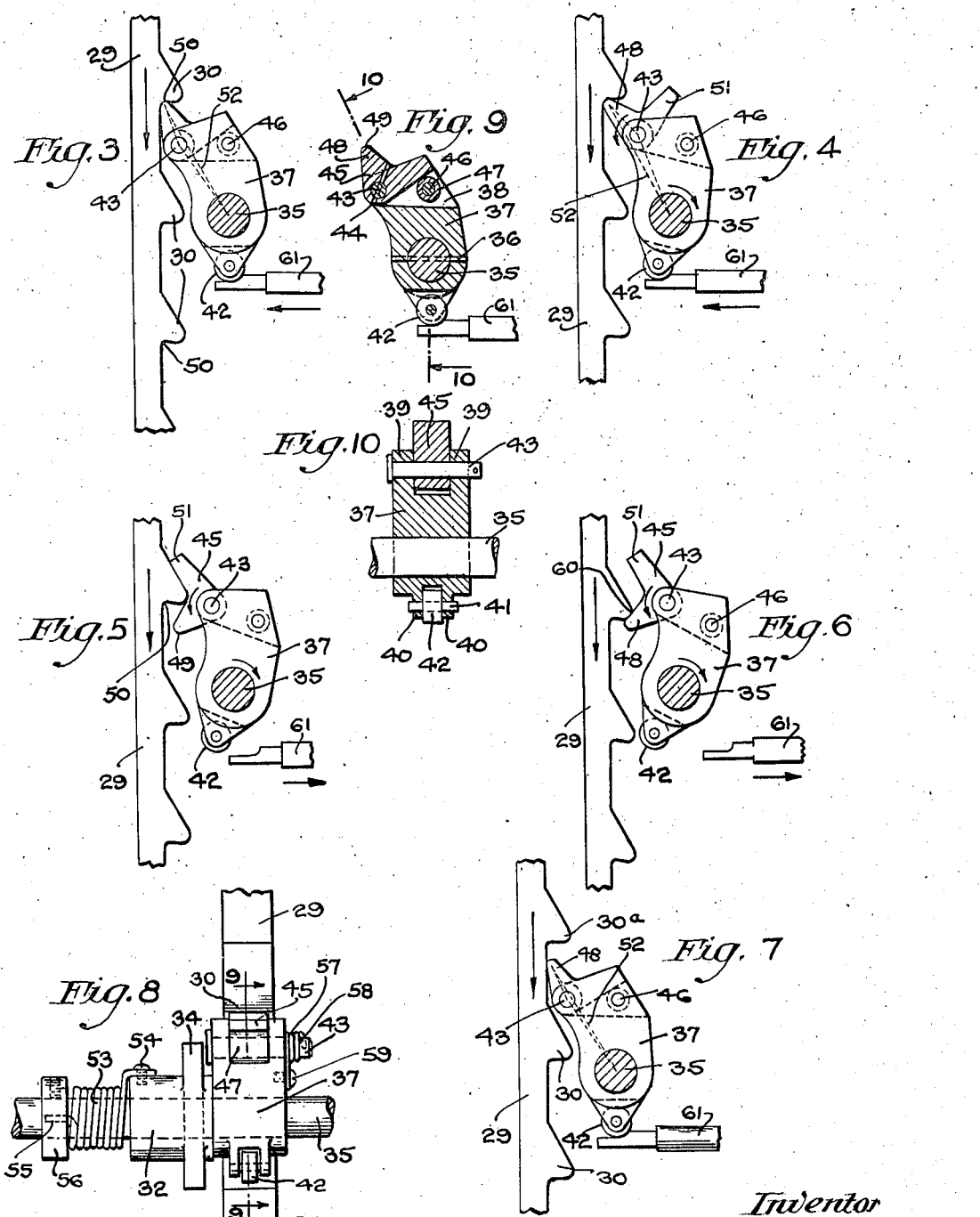

Patented May 4, 1943

2,318,567

UNITED STATES PATENT OFFICE 2,318,567

CONVEYER RELEASE MECHANISM

Alfred E. Duerig, Haddonfield, N. J., assignor to Campbell Soup Company, Camden, N. J., a corporation of New Jersey Application April 23, 1940, Serial No. 331,073

3 Claims. (Cl. 188—85)

This invention relates generally to material handling apparatus and more particularly to a release mechanism for controlling accurately and with precision the step-by-step descending movement of an elevator type of conveyer or lift.

In the handling of materials, it is frequently found necessary to lower the material conveyer step by step into positions wherein the materials may be either loaded upon or discharged from the conveyer by the simple expedient of shifting the materials in the plane of the conveyer load supporting surface. In certain cases, the conveyer may include but one load supporting surface, that is, it may be in the form of a single platform; while in other cases, the conveyer may include a plurality of vertically spaced load supporting surfaces each of which is adapted to receive its own complement of loaded materials. In any case, it is generally desirable and often necessary that the movement of the conveyer be so regulated and controlled that each material-receiving surface or platform thereof registers exactly with a closely adjoining surface onto which the materials may be discharged from the loaded platform of the conveyer or from which the materials may be delivered onto the conveyer platform.

This problem of effecting registry between a given load-supporting surface of the conveyer and an adjoining surface adapted to receive thereon or discharge therefrom the materials carried on the conveyer becomes more serious progressively as the conveyer load increases, because under heavy loads considerable difficulty is encountered in readily releasing the conveyer from its secured position. This difficulty is encountered particularly in those cases where devices are employed for positively locking the conveyer against accidental release, such devices being generally in the form of spring-pressed pawls or detents which act automatically to restrain the conveyer from dropping under its own weight. In the use of such pawls or detents, it is, of course, necessary in order to release the same to raise the lift sufficiently to free the detent. Obviously, in those cases where the lift is heavily loaded, considerable lifting effort is required to be expended to thus release the detent in order to permit the lift to be lowered to the desired point. Also, by so raising the conveyer to release the holding detent, control of the conveyer may be lost with the result that it may drop uncontrolled and under the impetus of its own weight to a point beyond that intended with resultant possible injury not only to the conveyer itself and the materials carried thereon, but also to the operator of the conveyer.

It is accordingly among the principal objects of the present invention to provide a release mechanism for a conveyer of the type described aforesaid which obviates the difficulties aforementioned and which provides for accurate and precise indexing of a movable load-supporting platform successively into a plurality of predeterminedly fixed positions arranged in vertically spaced relation.

More specifically, it is among the objects of the present invention to provide a release mechanism which is so operative that while it serves effectively as a rigid pawl or detent to safely hold the load-supporting platform securely in predeterminedly-fixed position, it may be actuated, when so desired, to release said platform for movement into another position without the necessity of first raising the platform to release the holding detent.

Still further, it is an object of the invention to provide a spring-pressed release mechanism in the form of a toggle-type pawl or detent which is operative in conjunction with a suitable rack carried by the movable platform to automatically release the latter for step-by-step movement into successive predeterminedly fixed positions, thereby assuring accurate and precise positional registry of the load-supporting platform with a closely adjoining stationary platform from or to which the material carried by the movable platform may be transferred in any suitable manner and by any suitable means.

Other objects and advantages of the invention will be apparent hereinafter, it being understood that the invention consists substantially in the combination, construction, location and relative arrangement of parts, all as shown in the accompanying drawings, all as described more fully hereinafter and as finally pointed out in the appended claims. It will be observed that while the accompanying drawings illustrate an arrangement wherein a multiple-platform movable lift or conveyer is associated with a single stationary surface from or to which the material carried by the platform may be transferred, the principles of the present invention are equally applicable to an arrangement wherein a single platform type of movable lift or conveyer is associated with a plurality of vertically spaced stationary load transferring surfaces. It will, accordingly, be understood that the present invention is not intended to be limited to the precise arrangement shown but instead may be applied generally to any arrangement of single or multiple-platform type of lift one or more of the platforms of which are desired to be brought into exact registry with one or more stationary material transferring stations.

In the said accompanying drawings:

Figure 1 is a side elevational view of a multiple-platform type of lift conveyer equipped with the release mechanism constructed in accordance with and embodying the principles of the present invention to insure exact and precise registry of each platform of the lift successively with a single stationary material transferring station.

Figure 2 is a horizontal sectional view of the arrangement shown in Figure 1 as taken on the line 2—2 thereof;

Figure 3 is an elevational view of the release mechanism per se showing the same in lift-holding position;

Figures 4, 5, 6 and 7 are further views of the release mechanism showing different positions assumed by the parts thereof as the lift is lowered one step;

Figure 8 is an end elevational view of the release mechanism per se;

Figure 9 is a vertical sectional view thereof as taken on the line 9—9 of Figure 8; and Figure 10 is a sectional view taken on the line 10—10 of Figure 9.

Referring now to the drawings and more particularly to Figures 1 and 2, it will be observed that the present invention has been applied to a material handling apparatus in the form of a vertically movable lift or conveyer, designated generally by the reference numeral 10. This lift or conveyer includes a horizontally disposed platform 11 the rear or supported end of which is provided with a pair of laterally spaced vertically extending members 12—12. Preferably, though not necessarily, these members 12—12 may be formed integrally with the horizontally extending side members 13 which respectively flank the base or load supporting surface of the movable platform 11. Also, as appears most clearly in Figure 2, the inner faces of the vertically extending members 12—12 are respectively grooved, as at 14—14, to provide vertical guides or channels within which are respectively received a pair of vertical uprights 15—15. These vertical uprights 15—15 are arranged in laterally spaced relation and form part of a fixed supporting frame 16 for the movable load supporting carriage 11, the latter being guided in its vertical movement by the members 12—12 thereof respectively slidably associated with the fixed upright guide members 15—15. Extending across the rear of the laterally spaced members 12—12 and interconnecting the same adjacent the upper ends thereof is a horizontally disposed angle member 17. Secured to the freely extending flange 18 of this angle member, preferably at a central point thereof is the upper end of a vertically extending piston rod 19, the latter being equipped at its lower end with a piston 20 operatively associated with a fluid pressure cylinder 21. This latter cylinder is fixed in any suitable manner to the base of the supporting structure 16 of the lifting apparatus, it being understood that the cylinder and piston are designed to be operated in conventional manner to raise and lower the vertically movable lift as desired.

Supported upon the freely extending horizontal platform 11 of the movable lift is a container or the like 22 which is adapted to receive the articles to be conveyed by the lift. This container 22 may be fixedly secured to the supporting platform 11 therefor or it may be merely placed on the said platform for subsequent removable therefrom. In either case, the container is preferably provided with closed side walls 23—23 and a closed back wall 24, the front, however, being entirely open to permit ready transfer of the articles or material to be handled laterally into or out of the interior of the container. In the form of container illustrated in the drawings, it is provided with a plurality of vertically spaced shelves 25 thus dividing the container into a plurality of vertically spaced individual compartments 26, each of which is adapted to receive its own complement of the articles or materials loaded into the container. Also, in the illustrated form of apparatus the materials to be loaded into the several compartments 26 of the container are delivered in any suitable manner to a stationary platform 27 the upper surface of which is disposed in a horizontal plane common to that of the lowermost shelf 25 of the container 22 when the latter is raised to its highest point. The said stationary loading platform 27 is preferably arranged in such close proximity to the free end of the movable lift platform 11 that as any one of the shelves 25 of the container 22 is brought into registry with the upper surface of the stationary platform 27, the material may be shifted readily from said stationary platform to said shelf or vice versa. There is thus obviated any necessity for manually lifting the articles or materials to be handled in order to transfer them from the stationary platform 27 to a given compartment 26 of the container or vice versa.

The present invention has as its principal object the provision of a mechanism for insuring accurate and precise registry of each of the shelves 25 of the container 22 with the stationary loading platform 27 successively as the container 22 is lowered from its highest to its lowest position. By thus successively presenting the several vertically spaced shelves 25 of the conveyer in registry with the stationary loading platform 27, the materials to be handled may be laterally shifted from said stationary loading platform 27 into each of the several compartments 26, the arrangement being such that as the lowermost compartment 26 is filled to capacity, the lift is lowered to present the second compartment in position to be filled, and so on until all of the compartments have each been filled with the materials or articles to be handled. In Figures 1 and 2, this material to be handled is represented by the box-like elements designated 28. It will be understood, of course, that the present arrangement may be operated reversely from that just described, that is, to effect discharge of the articles from the several filled compartments 26 of the container 22 onto the stationary loading platform 27.

The mechanism for insuring successive registry of the several shelves 25 of the container 22 with the stationary loading platform 27 will now be described. As appears most clearly in Figures 1 and 2, the vertically extending channeled guide members 12—12 of the movable lift are each provided upon their frontal edges with a vertically extending toothed rack 29, each of these racks being provided with the same number of vertically spaced tooth-like elements 30 as there are material supporting shelves 25 in the container 22. Operatively associated with each of these notched bars or racks 29 is a detent or pawl, designated generally by the reference numeral 31 in Figures 1 and 2. As will presently appear, these pawls 31 are respectively journalled in relatively fixed bearings 32—32 fixedly secured, as by the bolts 33 to the stationary uprights 15—15 of the supporting frame 16 for the lift. The detents or pawls 31 are located at a height sufficient to engage the lowermost tooth-like projections 30 of the notched bars or racks 29 when the latter are elevated to their highest position.

As appears most clearly in Figures 1, 2 and 8, the bearing members 32—32 of the pawl mechanisms 31 are each provided with a laterally extending flat arm 34 the outer or free extremities of which are adapted to be secured flatwise against the inner faces of the stationary upright guide bars 15 by means of the bolts 33 aforesaid. Projecting through and rotatably journalled within the aligned bores of the laterally spaced bearing members 32 is a shaft 35 the opposite extremities of the latter being extended freely beyond the outer faces of the bearing members 32. Keyed or otherwise non-rotatably secured, as by a transversely extending pin 36 (see Figure 9), to each projecting extremity of the shaft 35 is the main body 37 of the pawl or detent. As appears most clearly in Figures 8 to 10, the upper end of the pawl body 37 is notched out, as at 38, to provide a pair of laterally spaced parallel ears 39—39. The lower end of the pawl 37 is similarly bifurcated to provide a pair of laterally spaced depending ears 40 between which is journalled upon the transversely extending shaft 41 a roller 42.

Extending transversely across the upper rear corners of the upwardly projecting ears 39—39 of the pawl body is a shaft 43 to which is fixed, as by a pin 44 (see Figure 9) or otherwise, for rotation therewith a pawl element 45 of generally bell-crank shape. Also extending transversely across the upwardly projecting ears 39 adjacent the forward edges thereof is a fixed shaft 46 the effective diameter of which may be varied as desired by fitting it with a collar 47 of greater or less thickness.

It will be noted that the arm 48 of the pawl element 45 is provided with a rounded nose 49 the contour of which is so complementally shaped with respect to the curvature of the fillet 50 formed immediately beneath each projecting tooth-like projection 30 of the notched bar or rack 29 as to positively seat itself in one or the other of said fillets. It will also be observed that the remaining arm 51 of the pawl element 45, which may be termed the heel of said pawl element, is so arranged that the bottom surface thereof is adapted to engage and rest upon the transverse pin 46 when the pawl as a unit is in the operative position shown in Figures 3, 7 and 9. It is important to note that when the pawl is in the operative position just mentioned the pawl body 37 and the pawl element 45 are angularly so related that a straight line 52 drawn from the center of the nose 49 of the pawl element to the center of the main shaft 35 falls to the right of the axis of rotation of the pawl element 45 as viewed in Figures 3 and 9. The pawl body 37 and its associated pawl element 45 thus constitute in effect a toggle type of pawl which is operative to release the load supported thereby only when the toggle is broken, that is, when the straight line 52 aforesaid is shifted to the left of the axis of the shaft 43 (see Figure 4).

Referring now more particularly to Figure 8, it will be noted that the shaft 35 is so normally biased by a coil spring 53 that the upper end of the pawl body 37 tends normally to swing toward the notched bar or rack 29 with which it is operatively associated. To this end, one extremity of the coiled spring 53 is fixed, as at 54, to the bearing 32 for the shaft 35 while the opposite end of the said spring is fixed, as at 55, to a collar 56 non-rotatably secured to the said shaft 35. The pawl element 45 is in turn normally biased in the opposite direction through the intervention of a coil spring 57, one end of which is fixed, as at 58, to the shaft 43, while the opposite end is fixed, as at 59, to the main body 37 of the pawl. Thus, when the pawl is viewed as shown in Figure 3, the main body 37 of the pawl is normally biased in counter-clockwise direction while the pawl element 45 is normally biased in clockwise direction. Inasmuch as the transverse pin 46 limits the clockwise rotation of the pawl element 45, it will be apparent that under the action of the main coil spring 53 the pawl mechanism as a whole will normally be caused to rotate in counterclockwise direction only to the extent permitted by the cooperating rack bar 29. In other words, the main coil spring 53 tends normally to present the pawl as a unit into the position shown in Figure 3 wherein, due to the fact that the toggle connection arrangement between the elements 37 and 45 remains unbroken, the pawl serves effectively to engage any given tooth-like projection 30 of the rack bar 29 and so securely holds the lift against descending movement.

When it is desired to release the lift for movement downwardly one step in order, for example, to present the bottom of a next higher compartment 26 of the material receiver 22 in registry with the stationary loading platform 27, all that is necessary is to rotate the pawl body 37 in clockwise direction, i. e., counter to the normal bias of the main coil spring 53, to an extent only sufficient to break the toggle connection between the pawl elements 37 and 45. Having thus broken the toggle connection, the downwardly applied force upon the nose 49 of the pawl element 45 exerted by the weight of the load on the lift platform 11, is sufficient in itself to cause the pawl element 45 to rotate about its axis in the direction of the arrows as shown in Figures 4, 5 and 6, thus releasing the rack bars 29 and the lift platform to which said bars are fixed for downward movement. As the said rack bars 29 move downwardly, the pawl elements 45 rotate about their shafts 43 as just described and at the same time cam the main body members 37 of the pawls in clockwise direction as is also indicated by the arrows in Figures 4, 5 and 6. This action continues until the instant that the nose 49 of the pawl element 45 passes the nose 60 of the rack tooth with which it had been engaged, following which the pawl element 45, under the influence of the spring 58, snaps into its normal position as shown in Figures 3 and 7. Simultaneously, as the pawl element 45 snaps into its said normal position under the influence of the spring 57, the pawl as a whole snaps into the position shown in Figure 7 for engagement with the rack bar 29 under the influence of the coiled spring 53, the pawl being then in operative position to engage the succeeding tooth 30a of the descending rack bar 29.

It will, of course, be understood that any suitable device or mechanism may be employed for initially breaking the toggle connection between the main body 37 of the pawl and the pawl element 45. Inasmuch as the movement necessary to break this connection is relatively small, little effort is required therefor. Any suitable mechanical, electrical or electro-magnetic means may be employed for this purpose. In the arrangement shown, a simple bar 61 is employed for tripping the detent. As shown in Figures 3 and 4, upon shifting of this bar 61 in the direction indicated by the arrows, the main body 37 of the detent is rotated in clockwise direction sufficiently to break the toggle. Immediately upon the breaking of the toggle, the operating bar 61 may be retracted as indicated by the arrows in Figures 5 and 6, the operation of the pawl mechanism thereafter being entirely automatic. Where a shiftable release bar, such as 61, is employed, it may be desirable to shape the pawl contacting end thereof to snugly engage the roller 42 at the bottom of the pawl. Inasmuch as both of the laterally spaced pawl mechanisms as shown in Figures 1 and 2 are operatively associated with the single common shaft 35, it will be understood that actuation of either pawl mechanism will result in corresponding action of the other. Consequently, the device or mechanism employed for tripping the detent need be associated with only one of the pawl mechanisms. Of course, in certain instances it may be desirable to employ but a single pawl mechanism in association with a single rack bar and such arrangement is considered to be within the purview of the present invention.

An important feature of the present invention is that in order to effect release of the pawl or detent mechanism with respect to any given tooth of the rack bar 29 with which it may be then engaged, it is not necessary to first raise the loaded lift and its associated rack bars. Instead, without any initial movement whatsoever of the movable lift or any parts fixed thereto, by means other than possibly the action of the pawl itself, the detent mechanisms of the present invention may be tripped to permit the desired descent of the lift to the extent permitted by the automatic engagement of the detent mechanisms with the next higher teeth of the rack bars. Also, the mechanism of the present invention insures exact and precise registry of the several material receiving platforms of the descending lift with the stationary loading platform as the lift is lowered step by step. Furthermore, in the case where the present invention is applied to a descending lift as illustrated having a plurality of load receiving compartments, considerable saving of power is effected due to the fact that the only power required is that necessary to raise the unloaded lift to its highest point. As the lift descends step by step, it is cushioned against untoward shock by the action of the piston 20 upon the fluid in the fluid pressure cylinder 21 or by the use of a dash pot or other such known devices.

It will be understood, of course, that the invention is susceptible of various changes and modifications which may be made from time to time without departing from the general principles or real spirit thereof and it is accordingly intended to claim the same broadly, as well as specifically, as indicated in the appended claims.

What is claimed as new and useful is:

1. In a release mechanism of the character described, a main pawl body pivoted for oscillation about a relatively fixed axis, a pawl element pivoted for oscillation relatively to said main body about an axis spaced from and paralleling said fixed axis, said pawl element having a pair of angularly related arms, one of said arms extending freely of said main pawl body to engage a toothed rack bar and the other of said arms being adapted to engage a relatively fixed stop on said main body, said pawl element being normally so biased with respect to said main body as to maintain said pawl element in engagement with said stop and thereby locate a straight line extending between the tip of said freely extending arm and said relatively fixed axis of the pawl body to one side of the pivotal axis of said pawl element.

2. In a release mechanism of the character described, a main pawl body pivoted for oscillation about a relatively fixed axis, a pawl element pivoted for oscillation relatively to said main body about an axis spaced from and paralleling said fixed axis, said pawl element having a pair of angularly related arms, one of said arms extending freely of said main pawl body to engage a toothed rack bar and the other of said arms being adapted to engage a relatively fixed stop on said main body, said pawl element being normally so biased with respect to said main body as to maintain said pawl element in engagement with said stop and thereby locate a straight line extending between the tip of said freely extending arm and said relativelly fixed axis of the pawl body to one side of the pivotal axis of said pawl element, and means for oscillating said main pawl body about said relatively fixed axis whereby to shift the pivotal axis of the pawl element to the opposite side of said straight line to thereby cause said element under the influence of a force applied longitudinally of said rack bar to rotate about its axis and release said bar for movement in the direction of said applied force.

3. In a release mechanism of the character described, a movable toothed rack bar fixedly associated with a load-supporting member, a spring-pressed toggle-jointed pawl operatively associated with said rack bar and adapted automatically to engage successively the teeth thereof, said pawl being operative when in engagement with a given tooth of said rack bar and while the toggle-joint thereof is rigid to restrain said load-supporting member from movement, means for instantaneously breaking the toggle-joint of said pawl to render the same ineffective to hold said load-supporting member stationary, and means for automatically re-establishing the rigidity of said toggle-joint immediately following disengagement of the pawl from said given tooth and prior to its engagement with a next succeeding tooth.

ALFRED E. DUERIG.